Feb. 11, 1930.  P. FOURNIER  1,746,584
APPARATUS FOR TAKING VIEWS AND FOR THE REPRODUCTION
OF CINEMATOGRAPHIC FILMS IN COLORS
Filed June 19, 1925
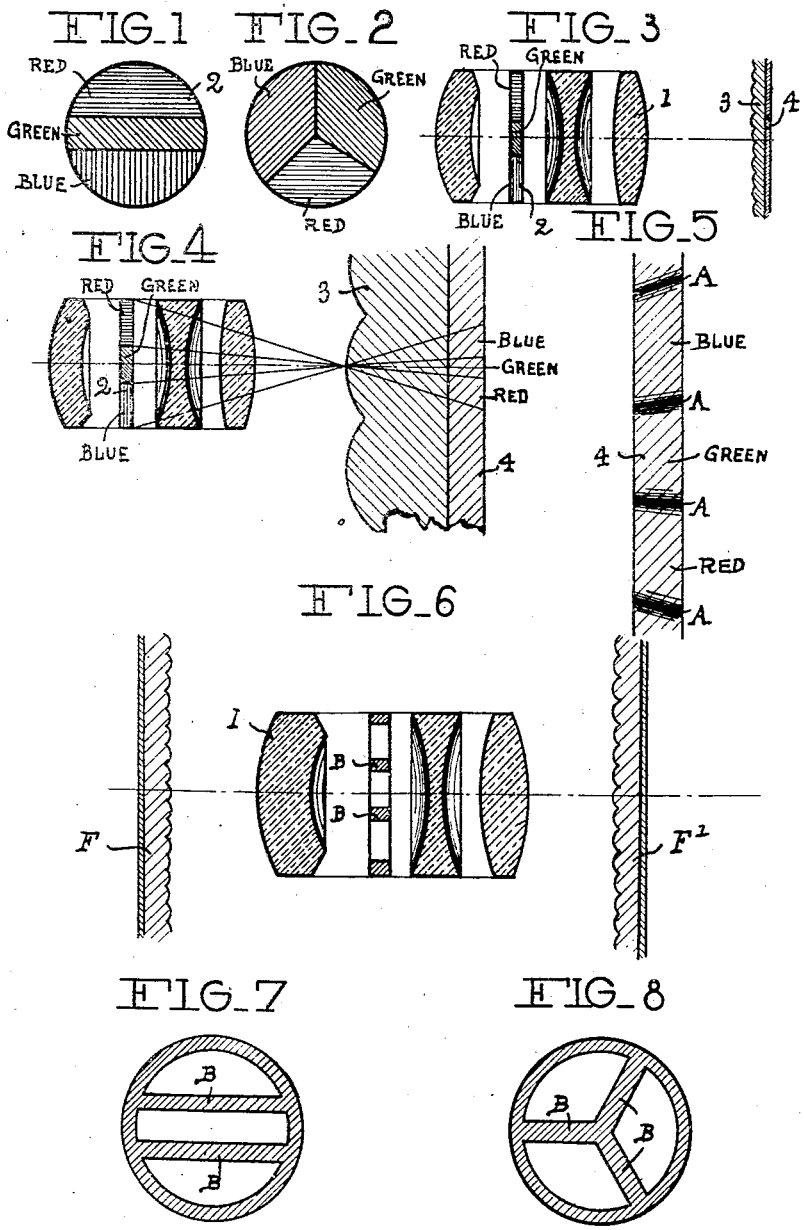

Patented Feb. 11, 1930

1,746,584

UNITED STATES PATENT OFFICE

PAUL FOURNIER, OF PARIS, FRANCE, ASSIGNOR TO SOCIETE FRANCAISE CINECHROMATIQUE PROCEDES R. BERTHON, OF PARIS, FRANCE

APPARATUS FOR TAKING VIEWS AND FOR THE REPRODUCTION OF CINEMATOGRAPHIC FILMS IN COLORS

Application filed June 19, 1925, Serial No. 38,358, and in France June 27, 1924.

My invention relates to apparatus for taking photographs and for reproducing cinematographic films in colors, more particularly where a lens provided with a diaphragm including a color filter and films with an embossed surface or reticulated support are used, as described in the French patent to Barthon No. 399,762 dated the 1st of May, 1908.

On examination of the gelatinous layer of a film with a reticulated support after development through a high power microscope, there will be observed, behind each lenticular element, clear or opaque parts corresponding to the zones of the selector disc. Also, it will be seen that there is no well defined demarcation between the zones whatever opacity they may have. This condition is caused by a diffusion which is manifested behind each lenticular element by two zones each common to two adjacent selective parts and tending to reduce the intensity and the correct rendering of the colors on projection.

However, it should be stated that this imperfection, although it undoubtedly produces an effect, does not make any noticeable difference to the projection when this is effected with an original film developed as a negative and then reversed.

But when it is desired to obtain prints from the original film (whether left as a negative or reversed to a positive) it will be found that diffusion is greatly increased and that films thus obtained can not be used on account of the colors being blurred.

My invention has for its object to prevent these disadvantages and to make it possible to obtain prints, in which the various color zones are as clearly defined as in the original.

This object I attain by means of an arrangement in which according to the present invention, a symmetrical lens system forms the objective and in which a stop having black bands is provided to prevent diffusion. Said black bands, both in the taking of photographs and in the reproduction, conform in position to the dividing lines of the color areas of the filter used in the taking of the pictures.

On the appended drawing on which I am giving an illustration of my invention by way of example, Fig. 1 represents a tri-color diaphragm, the colors being arranged in parallel bands; Fig. 2 represents a similar diaphragm with the colors arranged in sectors; Fig. 3 is a diagrammatic section of the optical system including a tri-color diaphragm according to Fig. 1. Fig. 4 diagrammatically illustrates the path of the light rays from the tri-color disc to the sensitized emulsion, the rays passing through a refracting element; Fig. 5 is a section through the emulsion; Fig. 6 is a diagram of the arrangement for printing from the original; Fig. 7 illustrates a stop with parallel opaque bands and Fig. 8 a stop with radial opaque bands.

In Figs. 3 and 4—1 denotes the lens, 2 the tri-color diaphragm with the colors arranged in parallel bands (Fig. 1), 3 the refracting elements and 4 the sensitized emulsion. Through each refracting element an image of the tri-color disc 2 is projected on the sensitized emulsion 4, which projection is conical. After the development of the negative, a diffuse zone A (Fig. 5) can be observed through the microscope, and in the printing from the original this diffuse zone will be reproduced over a larger surface of the print. Thus, the enlarged zones of the merging colors become almost one continuous zone with the result that distinct colors disappear nearly entirely from the print.

This great disadvantage is obviated by the present invention, according to which a stop, or diaphragm, is used, whereby the formation of diffuse zones is prevented both on the original and the prints made therefrom.

Said stop has the same diameter as the tri-color diaphragm and may either be superposed thereon or made a part thereof. The stop is provided with opaque bands B (Figs. 7 and 8) which are so arranged that they coincide with the joints of the adjacent edges of the various color sections of the tri-color diaphragms.

The stop shown in Fig. 7 is for use with a tri-color diaphragm such as shown in Fig. 1 and the stop shown in Fig. 8 for use with a color diaphragm such as shown in Fig. 2.

In the making of the original film, a stop provided with the opaque bands B is combined with the tri-color diaphragm, the arrangement being such that the bands B cover the joints of the color sections on said diaphragm. If a print is made from the original, the stop is placed in the plane of the tri-color diaphragm as shown in Fig. 6, from which it will be seen that the original film indicated at F and the print indicated at F' are placed equidistantly on either side of lens 1, the stop being placed in the plane of the tri-color diaphragm as illustrated in Fig. 3.

It may be stated theoretically, according to the conditions laid down in French patent No. 399,762 that it is possible to take a photograph with a lens having an aperture of F:3. The opacity of the film may be slightly augmented by the use of a lens of this kind, but the increased depth of field and the definition afforded by this lens are a great incentive to the choice of such an aperture.

For the making of prints or reproductions the use of a symmetrical lens having an approximate aperture of F:2 is therefore permissible, it being understood that the reproduction of the images is made in their natural size.

If there is placed a band having a width of two millimeters in the lens used for taking the photograph at the point where the selector disc is situated, it will be seen by an examination under the microscope, that the sensitized emulsion behind a lenticular element bears no trace of said black band.

However, if the width of the said black band is increased to three millimeters, it will be seen on examination, that its image appears on the sensitive layer. A series of experiments of the same kind confirms the assumption that the approximate width of three millimeters is the limit for definition or non-definition behind the lenticular element.

Thus, if black bands having a width of approximately three millimeters are used for separating the polychrome zones of the multi-color diaphragm, the diffusion will cease completely.

The production of prints similar to the originals as regards the color zones is then an easy matter, if care is taken to place as the stop of the symmetrical lens a disc of the same diameter as the diaphragm used for taking the photograph and provided with black bands positioned similarly to the joints of the color zones of the diaphragm.

The word "disc" when used for the stop does not imply that the stop must be exclusively defined by a circular outline, as it may be limited or defined by any kind of polygonal contour, provided only that the black bands completely cover the joints of the color zones of the diaphragm.

I claim:

1. An apparatus of the kind set forth, comprising in combination with an objective and means supporting a sensitive surface in image receiving relation thereto, a multi-color diaphragm having dividing lines between the color areas and interposed between said objective and sensitive surface, and a stop having opaque bands conforming in position to the dividing lines on said diaphragm.

2. An apparatus as specified in claim 1, wherein said stop is made as a disc of the same size and shape as said multi-color diaphragm, the narrow opaque bands corresponding in position to the dividing lines between the color areas of said diaphragm.

3. An apparatus as specified in claim 1, wherein said objective comprises a lens-system having an aperture of approximately F:2 and the width of the opaque bands of said stop is approximately three millimeters.

In testimony whereof he has affixed his signature.

PAUL FOURNIER.